United States Patent
Fisher (10) Patent No.: US 9,550,672 B2
(45) Date of Patent: Jan. 24, 2017

(54) METHOD FOR PREPARATION OF AN ALANE-ETHERATE COMPLEX AND ALANE

(71) Applicant: Intelligent Energy Inc., San Jose, CA (US)

(72) Inventor: Allison M. Fisher, Valley City, OH (US)

(73) Assignee: Intelligent Energy Inc., San Jose, CA (US)

( * ) Notice: Subject to any disclaimer, the term of this patent is extended or adjusted under 35 U.S.C. 154(b) by 86 days.

(21) Appl. No.: 14/558,240

(22) Filed: Dec. 2, 2014

(65) Prior Publication Data

US 2015/0093325 A1    Apr. 2, 2015

Related U.S. Application Data

(63) Continuation of application No. PCT/US2013/043978, filed on Jun. 4, 2013.

(60) Provisional application No. 61/655,509, filed on Jun. 5, 2012, provisional application No. 61/732,962, filed on Dec. 4, 2012.

(51) Int. Cl.
    *C01B 6/06*    (2006.01)
(52) U.S. Cl.
    CPC ...................................... *C01B 6/06* (2013.01)
(58) Field of Classification Search
    CPC ...................................................... C01B 6/06
    See application file for complete search history.

(56) References Cited

U.S. PATENT DOCUMENTS

| | | | |
|---|---|---|---|
| 3,329,390 A | 7/1967 | Hulsey et al. |
| 3,417,119 A | 12/1968 | Ehrlich |
| 3,458,089 A | 7/1969 | Maxson et al. |
| 3,642,853 A | 2/1972 | Murib et al. |
| 3,764,666 A | 10/1973 | Murib |
| 3,767,781 A | 10/1973 | Kraus et al. |
| 3,801,657 A | 4/1974 | Scruggs |
| 3,803,082 A | 4/1974 | Roberts et al. |
| 3,810,974 A | 5/1974 | King |
| 3,819,335 A | 6/1974 | Daniels et al. |
| 3,819,819 A | 6/1974 | Matzek et al. |
| 3,821,044 A | 6/1974 | Roberts |
| 3,823,226 A | 7/1974 | Brower et al. |

(Continued)

FOREIGN PATENT DOCUMENTS

| | | |
|---|---|---|
| FR | 2245569 | 4/1975 |
| WO | 2012017218 | 4/2012 |

OTHER PUBLICATIONS

Mirsaidov et al. "Hydrogenolysis of some alkyl halides with alkali and alkaline earth alumohydrides" 27-31 1981 (translation).*

(Continued)

*Primary Examiner* — Stanley Silverman
*Assistant Examiner* — Syed Iqbal
(74) *Attorney, Agent, or Firm* — Baker & Hostetler LLP (57) ABSTRACT

The invention relates to methods of forming an alane-etherate complex and α-alane from the alane-etherate complex. The methods include reacting an alkyl halide with a metal alanate in a solvent including an ether. A tertiary amine may also be added to the reaction. The alane is collected after removal of the solvent and/or the tertiary amine. An electrospraying process can be used to remove the solvent.

21 Claims, 2 Drawing Sheets

(A)    (B)    (C)    (D)

(56) References Cited

U.S. PATENT DOCUMENTS

| | | | |
|---|---|---|---|
| 3,829,290 A | | 8/1974 | Benerito et al. |
| 3,840,654 A | | 10/1974 | Diesen |
| 3,844,854 A | | 10/1974 | Matzek et al. |
| 3,857,930 A | | 12/1974 | Kraus et al. |
| 4,006,095 A | | 2/1977 | Hoffman et al. |
| 4,665,207 A | | 5/1987 | Marlett |
| 6,617,064 B2 | | 9/2003 | Petrie et al. |
| 6,838,209 B2 | | 1/2005 | Langan et al. |
| 6,955,863 B2 | | 10/2005 | Bean et al. |
| 6,984,746 B2 | | 1/2006 | Lund et al. |
| 7,238,336 B2 | | 7/2007 | Lund et al. |
| 7,732,372 B2 | | 6/2010 | Hampden-Smith et al. |
| 7,820,312 B2 | | 10/2010 | Eickhoff |
| 8,007,871 B2 * | | 8/2011 | Man .................. B05D 1/60 118/627 |
| 2004/0249006 A1 * | | 12/2004 | Gleason ............... C30B 5/00 521/61 |
| 2005/0222445 A1 * | | 10/2005 | Lund .................. C01B 3/00 556/187 |
| 2007/0066839 A1 | | 3/2007 | Lund et al. |

OTHER PUBLICATIONS

International Patent Application No. PCT/US2013/043980; Int'l Search Report and Written Opinion; dated Aug. 9, 2013; 12 pages.
International Patent Application No. PCT/US2013/043981; Int'l Search Report and Written Opinion; dated Aug. 20, 2013; 13 pages.
Brower et al., "Preparation and Properties of Aluminum Hydride", J. Am. Chem. Soc., 1976, 98, 2450-2453.
Tskhai et al. Rus. J. Inorg. Chem. 37:877 (1992).
Peltonen et al., Expert Opinion Drug Delivery, 2010, 7(6), 705-719.
Graetz et al., "Aluminum Hydride as a Hydrogen and Energy Storage Material: Past, Present, and Future" Journal of Alloys and Compounds, 2011, 509 Supplement 2, S517-S518.
Rietveld et al., J. Phys. Chem. B, 2006, 110, 23351-23364.
Fu et al., Aerosol Science and Technology, 2011, 45, 1176-1183.
Ho et al., Marcomolecular Research, 2011, 19(8), 815-821.
Hampden-Smith et al., "Manufacture of Electrocatalyst Powders by a Spray-Based Production Platform", Handbook of Fuel Cells—Fundamentals, Technology and Applications, 2010, p. 2-12.
Mirsaidov et al. "Hydrogenolysis of Some Alkyl Halides by Aluminohydrides of Alali Metals and Alkaline Earth Metals", 27-31, 1981.
Mirsaidov et al., "Study of the Reaction of Lithium and Sodium Tetrahydroaluminates with Hydrogen Chloride in a Medium of Organic Solvents", 92-95, 1975.
Bakum et al., "Method for the Perparation of Aluminum Hydride", Russian Journal of Inorganic Chemistry, vol. 55, No. 12, 2010, p. 1830-1832.
Cha et al., "Reaction of Aluminum Hydride-Triethylamine Complex with Selected Organic Compounds Containing Representative Functional Groups", Journal of Organic Chemistry, vol. 58., 1993, p. 3974-3979.
Finholt et al., J. Am. Chem. Soc., 1947, 69, 1199-1203.
International Search Report dated Jul. 19, 2013, issued in International patent application PCT/US2013/043978.

* cited by examiner

METHOD FOR PREPARATION OF AN ALANE-ETHERATE COMPLEX AND ALANE

This patent application is a Continuation of International patent application PCT/US2013/043978 filed Jun. 4, 2013, which claims priority to Provisional patent application 61/655,509 filed Jun. 5, 2012, and Provisional patent application 61/732,962 filed Dec. 4, 2012, the disclosures of which are incorporated by reference in their entirety.

TECHNICAL FIELD

This invention relates to a method for synthesizing alane-etherate complex, which is based on the reaction of metal aluminohydrides and alkyl halides in ethereal or mixed ethereal-hydrocarbon solvents. Alane can be produced from the alane-etherate complex.

BACKGROUND OF THE INVENTION

A key limiting factor in the widespread adoption of proton exchange membrane fuel cell (PEMFC) based power systems is hydrogen fuel storage. The development of a viable hydrogen storage solution will have a profound impact on how consumers will power portable devices, since batteries simply cannot match demands for runtime, energy density and reliability.

Because hydrogen has poor energy content per volume (0.01 kJ/L at STP and 8.4 MJ/L for liquid hydrogen vs. 32 MJ/L for petroleum), physical transport and storage as a gas or liquid is impractical. Additionally, the compression process to achieve the pressures necessary to reach a high density is energy-intensive and doesn't solve the hazard issue. Also, the densities of compressed $H_2$ or liquefied $H_2$ are still below those required to reach practical fuel storage goals.

Physical means to store hydrogen include sorbents such as carbon nanotubes and foams, zeolites, metal-organic frameworks; and intermetallics such as titanium-manganese alloy 5800, complex hydrides such as metal alanates, amides, and borohydrides, and chemical hydrides such as sodium borohydride/water and ammonia borane (AB). Despite intensive and elegant work on sorbents and complex hydrides, practical systems that can store and release ≥6 wt % hydrogen at moderate temperatures are still far from realization.

Alane is an attractive candidate for solid hydrogen storage and release because it has a density of 1.48 g/cm³ and releases up to 10 weight percent hydrogen and aluminum in a single step upon heating to ≥200° C. Alane's formula is sometimes represented with the formula $(AlH_3)_n$ because it is a polymeric network solid. Alane is formed as numerous polymorphs: the alpha (α), alpha prime (α'), beta (β), delta (δ), epsilon (ε), zeta (ζ), or gamma (γ) polymorphs. Each of the polymorphs has different physical properties and varying stability. The most thermally stable polymorph is α-alane, featuring aluminum atoms surrounded by six hydrogen atoms that bridge to six other aluminum atoms. The Al—H distances are all equivalent and the Al—H—Al angle is approximately 141°. While α-alane's crystals have a cubic or hexagonal morphology, α'-alane forms needlelike crystals and γ-alane forms a bundle of fused needles. Typically, the lightweight, unstable γ-alane is produced first, converting under certain conditions to the more stable rhombohedral β-alane polymorph first, then to α-alane. When trace amounts of water are present during crystallization the δ-alane and ε-alane can be formed. The ζ-alane polymorph is prepared by crystallization from di-n-propyl ether. The α', δ, ε, and ζ polymorphs do not convert to α-alane upon heating and are less thermally stable than α-alane.

Crystalline alane has many uses including: hydrogen storage, inorganic and organic synthesis, as an ingredient in propellants and pyrotechnics, as a polymerization catalyst, and as a precursor to aluminum films and coatings. Consequently there has been considerable research carried out on the preparation of alane, since the first report of its preparation in 1942 (Stecher and Wiberg, Ber. 1942, 75, 2003). Finholt, Bond, and Schlesinger reported an improved method of synthesis of alane-diethyl etherate in 1947 which has formed the foundation for most of the reported methods for the synthesis of non-solvated crystalline alane (J. Am. Chem. Soc., 1947, 69, 1199). The reaction is shown below, and the amount of ether complexed to the alane product depended on the length and temperature of the drying step of the reaction.

$$3LiAlH_4 + AlCl_3 \rightarrow 4AlH_3 + 3LiCl$$

Reports describing the preparation and stabilization of non-solvated crystalline alane began to appear in the patent literature in 1974 (Scruggs, U.S. Pat. No. 3,801,657, Roberts et al. U.S. Pat. No. 3,803,082, King, U.S. Pat. No. 3,810,974, Matzek et al. U.S. Pat. No. 3,819,819, Daniels et al. U.S. Pat. No. 3,819,335, Roberts, U.S. Pat. No. 3,821,044, Brower et al. U.S. Pat. No. 3,823,226, Schmidt et al. U.S. Pat. No. 3,840,654, and Self et al. U.S. Pat. No. 3,844,854). Removal of the residual diethyl ether ("desolvation") was effected by using higher than stoichiometric ratios of complex aluminum hydride to aluminum chloride, as well as inclusion of lithium borohydride as a "seeding" or "crystallization" agent. Several patents describe the use of sodium aluminum hydride instead of lithium aluminum hydride (Ashby et al. U.S. Pat. No. 3,829,390, and Kraus et al. U.S. Pat. No. 3,857,930). As disclosed in these patents and Brower et al. ("Brower"), "Preparation and Properties of Aluminum Hydride," J. Am. Chem. Soc., 1976, 98, 2450, alane is usually synthesized by reacting aluminum trichloride ($AlCl_3$) and metal aluminum hydride ($MAlH_4$) in diethyl ether or diethyl ether-hydrocarbon solvent mixtures. The aluminum trichloride was dissolved in diethyl ether at −10° C. A minimum of three mole equivalents of $MAlH_4$ was added to the aluminum trichloride solution to produce a solvated alane-ether complex and a precipitate of metal chloride (MCl, e.g. LiCl or NaCl). In order to desolvate the alane-ether complex, 0.5 to 4.0 mole equivalents of a borohydride salt, such as lithium borohydride or sodium borohydride, was mixed with the solution including the alane-ether complex. The mixture was filtered and the filtrate was diluted with toluene or benzene to provide an ether to toluene or benzene ratio of 15:85. The mixture was heated to 85° C. to 95° C. to desolvate the alane-ether complex and the diethyl ether was subsequently removed by distillation. The precipitated alane was recovered by aqueous acid quenching, filtration, and washing. Brower also discloses that the reaction is conducted in the absence of water, oxygen, and other reactive species because if water is present, the δ and ε polymorphs are undesirably formed.

The methods reported for stabilization of the reactive alane product during this time included in situ or subsequent treatment of alane with an alkyl or aryl silicol, coating the alane surface with an organic compound containing at least one phenyl group or a condensed ring structure, and washing the alane product (often with some amount of magnesium included in the preparation step) with an aqueous solution buffered at from about pH 6 to 8.

However, the large volumes of solvent required as well as the excess aluminohydride and borohydride salts used to desolvate the alane-ether complex make these syntheses of α-alane expensive. The borohydride salts also generate byproducts that require disposal. Furthermore, the alane produced by the method of Brower is typically contaminated with undesirable polymorphs and is prone to decomposition during desolvation.

Current methods for the preparation of alane are expensive because of, among other things, the high cost of the large amounts of solvent needed to prepare the stable α-alane crystalline phase. It would be desirable to reproducibly produce a high yield of α-alane using a low-cost method.

An object of the present invention is to provide an improved low-cost method for the preparation of α-alane suitable for use as a solid hydrogen storage and release material. In addition, alane-etherate can be used as a reducing agent in organic synthesis and as an initiator in polymerization reactions.

SUMMARY OF THE INVENTION

According to one aspect of the invention, alane-etherate is prepared by reacting one or more alkyl halides with one or more metal alanates in a solvent including an ether. Embodiments can include one or more of the following:
  a single alkyl halide is used;
  a single metal alanate is used;
  the alkyl halide includes benzyl chloride;
  the alkyl halide includes n-butyl bromide;
  the metal alanate includes lithium aluminum hydride;
  the metal alanate includes sodium aluminum hydride;
  the solvent includes diethyl ether; and
  the method includes adding a tertiary amine in the step of forming the alane-etherate complex; the tertiary amine can be removed; the tertiary amine includes a trialkylamine.

According to another aspect of the invention, alane is produced by forming an alane-etherate complex using the method described above, desolvating the alane-etherate complex, and collecting the alane. Preferably the alane is α-alane. Embodiments can include one or more of the following:
  desolvating the alane-etherate complex includes vacuum distillation;
  desolvating the alane-etherate complex includes spray desolvation;
  the spray desolvation includes electrospinning; and
  the spray desolvation includes electrospraying; the electrospraying can include heating at a temperature from greater than 60° C. to less than 120° C.; the temperature can be at least 65° C.; the temperature can be no greater than 100° C.; desolvating the alane-etherate complex includes collecting electrosprayed material and annealing the collected electrosprayed material to form the α-alane; the annealing can be done at a temperature of from 65° C. to 100° C.

The process for producing alane-etherate is superior to existing methods because of the lower amounts of salts to filter out, lower levels of solvents used, and higher purity of the alane-etherate complex. Solvent can be removed from the alane-etherate complex to provide α-alane with superior purity and properties compared to methods based on other methods such as the reaction of metal aluminum hydride with aluminum chloride. These and other advantages of the invention will be further understood and appreciated by those skilled in the art by reference to the following written specification and claims.

DETAILED DESCRIPTION OF THE PREFERRED EMBODIMENTS

The embodiments of the present inventions described below are not intended to be exhaustive or to limit the invention to the precise forms disclosed in the following detailed description. Rather the embodiments are chosen and described so that others skilled in the art may appreciate and understand the principles and practices of the present inventions.

All publications and patents mentioned herein are incorporated herein by reference in their respective entireties for the purpose of describing and disclosing, for example, the constructs and methodologies that are described in the publications which might be used in connection with the presently described invention. The publications discussed above and throughout the text are provided solely for their disclosure prior to the filing date of the present application. Nothing herein is to be construed as an admission that the inventor is not entitled to antedate such disclosure by virtue of prior invention.

For purposes of description herein, the terms "upper," "lower," "right," "left," "rear," "front," "vertical," "horizontal," and derivatives thereof shall relate to the invention as oriented in the figures. However, it is to be understood that the invention may assume various alternative orientations and step sequences, except where expressly specified to the contrary. It is also to be understood that the specific parts, devices and processes illustrated and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Alane-etherate can be formed upon reduction of an alkyl halide with a metal alanate in a suitable solvent that contains ether, as shown below. It is preferred that the solvent be 100% diethyl ether; however mixtures of toluene and diethyl ether can be used. The alkyl halide can be any suitable alkyl halide such a 1-bromobutane or benzyl chloride. The stoichiometry of the reaction can be varied such that either the alkyl halide or the metal aluminum hydride can be used in excess. Optionally, when using sodium aluminum hydrides it is desirable to include a soluble $Li^+$ species to increase the rate of the reaction.

M = Li, Na
R = akyl, aryl

The formation of an alane-tertiary amine adduct, and other alane-solvent complexes can result when using a tertiary amine as part of the reaction. Removal of the solvent and/or the tertiary amine can be carried out using standard protocols. Examples of the reaction processes are shown below. However, any metal alanate (including those disclosed below (Li and Na), others not expressly disclosed herein, or combinations thereof), alkyl halide (including those disclosed herein (benzyl chloride and n-butyl bromide), others not expressly disclosed herein, or combinations thereof), or tertiary amine (including those disclosed below (trialkylamine), others not expressly disclosed herein, or combinations thereof) may be used.

M = Li, NA
R = akyl, aryl

The solvent can be removed from the alane-etherate complex by various methods or combinations of methods, including distillation at ambient or reduced pressure, heating at ambient or reduced pressure, and a spray desolvation process such as electrospinning or electro spraying.

Brower, et. al. (1975) describes methods of creating non-solvated α-alane from an alane ether complex. Brower also discloses that the reactions should be conducted in the absence of water, oxygen, and other reactive species.

Alternatively, as described in French Patent No. FR2245569 (1975), to desolvate and crystallize the α-polymorph, the diethyl ether may be removed from the crystallization solution, such as by distilling the diethyl ether. The distillation can be carried out between 50° and 85° C. At the bottom of this range, between 50° and 65° C., etherate intermediate is formed and is converted into α-alane. However, at the top of this range, between 65° and 85° C., etherate aluminum hydride does not appear and stable α-alane precipitates are formed almost immediately. By keeping the mixture in 8 percent to 10 percent of ether after the initial distillation, a final α-alane product may be obtained with superior features. Retention of the ether allows the rearrangement of alane during the conversion to the α form of alane as thermal decomposition of the crystal is reduced and the final product is crystalline.

Alternatively, to remove the diethyl ether, the crystallization solution may be heated at ambient or reduced pressure, as described in U.S. Pat. No. 7,238,336 to Lund et al. For instance, if the diethyl ether is removed under vacuum, the crystallization solution may be heated at a temperature ranging from approximately 50° C. to approximately 60° C. However, if the diethyl ether is removed at ambient pressure, a temperature ranging from approximately 80° C. to approximately 100° C., such as from approximately 80° C. to approximately 97° C., may be used. A rate at which the diethyl ether is removed may affect the formation of the α-alane. If the diethyl ether is removed too quickly, the alane-ether complex may precipitate from the crystallization solution rather than forming the crystals of the α-alane. However, if the diethyl ether is removed too slowly, the crystallization process may be too long for practical and economical purposes. In one embodiment, the diethyl ether is removed by heating the crystallization solution to a temperature ranging from approximately 80° C. to approximately 95° C. Multiple heating cycles and subsequent dilutions with additional diethyl ether may be used to crystallize the α polymorph. The amount of diethyl ether in the crystallization solution may initially be reduced to less than approximately 10% by volume by heating the crystallization solution to a temperature ranging from approximately 80° C. to approximately 87° C., such as from approximately 82° C. to approximately 85° C. The remaining volume of the crystallization solution may then be heated until a precipitate is formed.

At an initial point in the distillation, spherical particles of the alane-ether complex may be present. These spherical particles may not necessarily be α-alane crystals but are crystalline. However, as the diethyl ether is distilled, alane crystals may begin to form. The crystals formed initially may have a needlelike morphology, indicating formation of the α' polymorph. After the α' polymorph forms, additional diethyl ether may be added to the growing crystals. The additional diethyl ether may be removed by heating to a temperature ranging from approximately 88° C. to approximately 95° C., such as from approximately 88° C. to approximately 92° C. After removing the additional diethyl ether, the crystals may have a cubic or rhombohedral appearance, indicating formation of the α polymorph. Without being bound to a particular theory, it is believed that the α' polymorph crystals may transform to crystals of the α polymorph upon heating and during distillation of the diethyl ether. After substantially all of the diethyl ether has been removed, the crystals may be filtered to remove any remaining toluene and seed crystals that are present, leaving the crystals of α-alane wetted with diethyl ether and toluene. The α-alane crystals may be washed with an aqueous acidic solution to remove any impurities, such as at least one of aluminum (formed by pyrolysis), the α' polymorph, lithium chloride, $LiAlH_4$, and other undesirable polymorphs. The acidic solution may include from approximately 0.1% by volume to approximately 25% by volume of an acid, such as HCl, hydrofluoric acid, hydrobromic acid, phosphoric acid, perchloric acid, sulfuric acid, boric acid, or mixtures thereof. In one embodiment, the acidic solution includes from approximately 10% by volume to approximately 12% by volume of HCl. The crystals of the α-alane may then be filtered to remove the acidic solution. The α-alane crystals may be rinsed with water to remove remaining trace amounts of the acidic solution, followed by rinses with acetone or isopropanol to remove the water. The α-alane crystals may then be dried.

As yet another alternative, the solvent may be removed from alane by vacuum drying at temperatures between 30 and 90° C. This process may be enhanced when a desolvating species is present such as a complex metal hydride (LiAl$_4$, LiBH$_4$) or a metal halide (e.g., LiCl). See, e.g., A. N. Tskhai et al. Rus. *J. Inorg. Chem.* 37:877 (1992), and U.S. Pat. No. 3,801,657 to Scruggs. The desolvating species can be removed with a solvent that preferentially dissolves the desolvating species over the metal hydride. The desolvating species can also be removed with a solvent that preferentially dissolves the metal hydride over the desolvating species (as disclosed in U.S. Pat. No. 3,453,089 to Guidice). After removal the desolvating species can be recovered for further use.

Electrospraying employs electricity to disperse a liquid, usually resulting in a fine aerosol. High voltage is applied to a liquid supplied through an emitter (usually a glass or metallic capillary). Ideally the liquid reaching the emitter tip forms a Taylor cone, which emits a liquid jet through its apex. Varicose waves on the surface of the jet lead to the formation of small and highly charged liquid droplets, which are radially dispersed due to Coulomb repulsion. Electrospraying does not involve the use of polymers, so the jet emerging from the Taylor cone forms micro- or nano-scale droplets that dry rapidly, producing a coating of fine particles on the collector.

Similarly to the standard electrospraying, the application of high voltage to a polymer solution can result in the formation of a cone-jet geometry. If the jet turns into very fine fibers instead of breaking into small droplets, the process is known as electrospinning Electrospinning uses an electrical charge to draw micro- or nano-scale fibers from a liquid. Typically this involves pumping or dripping a polymer solution through a nozzle maintained at a high relative potential. The drops of solution become charged and electrostatic forces counteract the surface tension, at a critical point a jet of liquid is produced from the Taylor cone. As the jet travels through the atmosphere, the solvent evaporates, so when the jet reaches the collector plate it has formed dry polymer fibers. The electrospinning process can be further subdivided into single-phase or coaxial spinning; single-phase uses a single polymer solution in a relatively simple process, while the more complex co-axial spinning uses two solutions pumped through concentric needles, allowing finer control over material properties.

Both of these electro-hydrodynamic processes are controlled and affected by a wide variety parameters. The parameters include: solution parameters (such as viscosity/rheometry, surface tension, vapour pressure, conductivity, and dielectric constant); environmental parameters (such as temperature, and humidity/atmosphere); and process parameters (voltage, nozzle geometry, flow rates, and nozzle and plate separation).

There are a number of different spinning or spraying configurations that may be used, these include: 1) vertical (where the needle points downwards and material is collected on a flat plate); 2) horizontal (where the needle is horizontal and material is collected on a vertical plate); 3) spinning collector (where the material is collected on a spinning drum); and 4) multinozzle (where solution is pumped simultaneously through multiple nozzles housed in a discrete unit). These units may be joined to many other units to provide a scalable technology.

A stable spraying/spinning process is one where a Taylor cone forms consistently and shows little deviation during the process. The importance of this is: 1) to provide consistent fibers/beads/particles; and 2) to produce a scalable process.

Electrospraying can be used to reduce the amount of solvent in an alane-etherate solution. This is due to rapid evaporation occurring from the small particles produced during electrospraying. Electrospraying also removes more solvent than vacuum drying alone, and can potentially eliminate a vacuuming drying step in the process of alane production. Electrospraying also results in a more consistent particle size and morphology.

Removal of the tertiary amine can be accomplished by thermally decomposing the tertiary amine-alane adduct in the presence of a catalytic amount of a Group 1 or Group 2 metal hydride or organometallic catalyst as described in U.S. Pat. No. 3,764,666 to Murib, forming alane and the corresponding tertiary amine. As used herein, group designations of the Periodic Table of the Elements are according to the IUPAC (International Union of Pure and Applied Chemistry) Nomenclature of Inorganic Chemistry, Recommendation 2005, in which Group 1 includes the alkali metals, Group 2 includes the alkaline earth metals, Group 3 is the scandium group of transition metals, and so on. The reaction proceeds according to the equation:

where R$_1$, R$_2$, and R$_3$ are organic radicals, n$_1$ and n$_2$ are integers equal to one or more. The process is carried out at a temperature above the decomposition temperature of the tertiary amine-alane adduct to form alane and the corresponding tertiary amine, but below the decomposition temperature of alane. It is preferred that the temperature be less than 90° C., for example, in the range of 35° C. to about 90° C. At temperatures below 35° C., the rate of decomposition is extremely slow, but the process can still be carried out at lower temperatures if speed is not a disadvantage. To prevent hydrolysis of the alane, the reaction mixture should be anhydrous, and the system should be oxygen-free, such as under nitrogen or other inert gas.

To assist in driving the decomposition reaction to completion, at least one of the products should be removed from the reaction mixture, preferably as it is formed. The tertiary amine can be removed from the reaction zone by distillation, desirably under reduced pressure, so as to keep the reaction mixture at below 90° C. The amine also can be removed by sweeping with inert diluent or solvent vapors, or with an inert gas, such as nitrogen. A reduced pressure, if used, is not so low that the tertiary amine-alane adduct is volatilized at the temperature at which the reaction is carried out. Generally, pressures of from about $10^{-8}$ up to about 50 mm of Hg are satisfactory. Reaction is complete when evolution of tertiary amine ceases.

The alane can be washed with a nonsolvent for alane that is a solvent for the amine-alane adduct and also preferably for the metal hydride or organometallic catalyst separating the solid aluminum hydride residue, followed by vacuum distillation of the residue to about $1^{-8}$ mm Hg and at a temperature up to the decomposition temperature of the alane product, to remove the solvent and any other volatile impurities.

In order to facilitate the intimate admixture of the metal hydride catalyst and the tertiary amine-alane adduct, the materials are preferably mixed as slurries or solutions in an inert liquid or solvent medium. This liquid or solvent can be removed before decomposition of the adduct, if desired.

Removal of the tertiary amine can also be accomplished by applying a reduced pressure to the reaction vessel or container. Alternatively, the reaction mixture is sparged with an inert gas to remove the trialkylamine. Any gas that is inert to the desired product may be used. In some embodiments, the inert gas is air, oxygen, nitrogen, argon, or a gaseous alkane or alkene, and mixtures thereof may be used. Typically, however, nitrogen is used as the inert gas, particularly when the trialkylamine is trimethylamine. Detrialkylamination may also be done via membrane, hydrogenolysis, extraction, selective adsorption, selective absorption, precipitation, distillation, azeotropic distillation, adding a solvent, combinations of these, and the like.

These methods have the distinct advantage of not using $AlCl_3$, which is hygroscopic and difficult to handle. The feedstocks for these reactions are potentially significantly cheaper overall than the standard alane processes based on the reaction of excess metal alanates with $AlCl_3$. Additional advantages include a reduced amount of LiCl product and the ease of handling the alkyl halide starting material.

The following aspects of the invention can be altered and extended without losing the advantages of the invention:
- the metal (such as Li, Na, or another metal) alanate or combination of metal alanates used,
- the alkyl halide (such as n-butyl bromide, benzyl chloride, etc.) or combination of alkyl halides that is reduced by $[AlH_4]^+$ to form $AlH_3$,
- the inclusion of phase transfer catalyst(s),
- the inclusion of trialkylamine or other complexing ligand,
- the order of addition and stoichiometry of the reagents described above,
- operating temperatures, and
- reaction solvent.

While the above process describes the preferred reaction process, those skilled in the art will realize that other and further embodiments can be made without departing from the spirit of the inventive method of making α-alane.

A crystallization additive may be added to help form the α-alane crystals. The crystallization additive may promote growth of the α polymorph by providing a nucleation site for the α polymorph. The crystallization additive may also suppress formation of the undesirable polymorphs. It is also believed that early precipitation of the crystals may promote the growth of the α polymorph. Seed crystals of α-alane may be added during the crystallization to promote the growth of the α-alane. The seed crystals may subsequently be incorporated into the α-alane. The crystallization additive may also be an aprotic, electron-rich material. For instance, the crystallization additive may be an olefin, a polyolefin, an anisole, a polydimethyl siloxane, a tertiary amine, an aliphatic or aromatic ether, or mixtures thereof. The olefin may include, but is not limited to, squalene, cyclododecatriene, norbornylene, norbornadiene, a phenyl terminated polybutadiene, and mixtures thereof. The anisole may include, but is not limited to, 2,4-dimethyl anisole, 3,5-dimethyl anisole, 2,6-dimethyl anisole, and mixtures thereof. These compounds are commercially available from various manufacturers, such as from Sigma-Aldrich Co. (St. Louis, Mo.). The crystallization additive may also be polydimethyl siloxane. The crystallization additive may also be a combination of any of the additives.

The α-alane crystals may be washed with an aqueous acidic solution to remove any impurities, such undesirable polymorphs or other impurities that exist as a result of the starting materials or the reaction process. The acidic solution may include from approximately 1 percent by volume to approximately 25 percent by volume of an acid, such as HCl, hydrofluoric acid, hydrobromic acid, phosphoric acid, perchloric acid, sulfuric acid, boric acid, or mixtures thereof. The acidic solution may include approximately 10 percent by volume to approximately 12 percent by volume of HCl. The crystals of the α-alane may then be filtered to remove the acidic solution. The α-alane crystals may be rinsed with water to remove remaining trace amounts of the acidic solution, followed by rinses with acetone or isopropanol to remove the water. The α-alane crystals may then be dried.

Examples have been set forth below for the purpose of illustration and to describe the best mode of the invention at the present time. However, the scope of this invention is not to be in any way limited by the examples set forth herein.

EXAMPLE 1

Preparation of Alane-Etherate by Reaction of Benzyl Chloride and Lithium Aluminum Hydride Anhydrous diethyl ether (15 mLs) is added to a dry 100 mL single neck round bottom flask equipped with a magnetic stir bar and reflux condenser under Ar atmosphere. A solution of lithium aluminum hydride in diethyl ether (1 M, 1185.mLs, 1185 mmol) is added via syringe with stirring under Ar. Neat benzyl chloride (0.91 mL, 7.90 mmol) is then added via syringe and the reaction mixture is warmed to reflux and stirred overnight under Ar. GC/MS analysis of an aliquot taken from the reaction mixture indicates when the conversion of benzyl chloride to toluene is complete.

After cooling to room temperature, the reaction slurry is filtered under Ar, providing a 0.33 M solution of alane-etherate in diethyl ether solution. The alane is isolated from the solution by any of the methods described above, including those described in Brower, et al.

EXAMPLE 2

Preparation of Alane-Etherate by Reaction of Benzyl Chloride with a Mixture of Sodium Aluminum Hydride and Lithium Aluminum Hydride Sodium aluminum hydride (0.427 g, 7.90 mmol) is added to a dry 100 mL single neck round bottom flask equipped with a magnetic stir bar, sealed with a rubber septum, and put under Ar atmosphere. Anhydrous diethyl ether (25 mL) is added to this flask using a syringe, and the septum is then quickly replaced by a reflux condenser under flow of Ar. A solution of lithium aluminum hydride in diethyl ether (1 M, 1.98 mLs, 1.98 mmol) is added via syringe with stirring under Ar, followed by neat benzyl chloride (0.91 mL, 7.90 mmol). The reaction mixture is warmed to reflux and stirred overnight under Ar. GC/MS analysis of an aliquot taken from the reaction mixture would show that the conversion of benzyl chloride to toluene is complete.

After cooling to room temperature, the reaction slurry is filtered under Ar, providing a 0.33 M solution of alane-etherate containing 0.25 eq of lithium aluminum hydride in diethyl ether solution. The alane is isolated from the solution by any of the methods described above, including those described in Brower, et al.

EXAMPLE 3

Electrospraying of Alane-Ether Solutions

Figure 1:
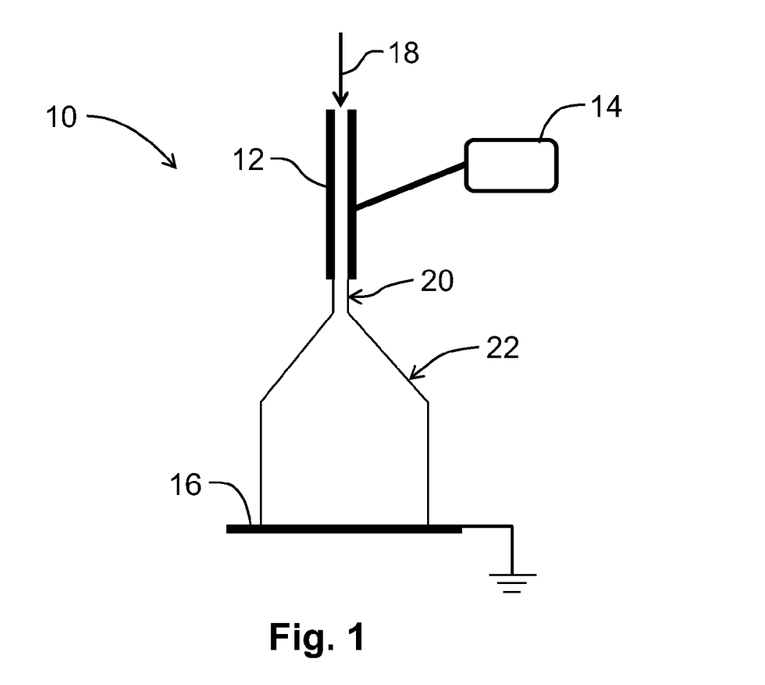
FIG. 1 shows a schematic drawing of an electrospraying assembly.

An electrospraying apparatus as shown in FIG. 1 was assembled in an inert-atmosphere water-free glovebox. The apparatus 10 included a nozzle 12 through which an alane-etherate solution (alane in diethyl ether) was sprayed. A high voltage direct current power supply 14 was connected to the nozzle 12. The charged liquid spray included a straight jet 20 and a plume 22 of droplets, and material was collected on a collection plate 16. The process parameters, such as temperature, applied voltages, nozzle geometry, solution flow rate, the distance between nozzle and collection plate, and direction of spraying can be adjusted to control the amount of solvent removed and the particle size distribution and morphology of the alane produced, as well as to prevent or eliminate the release of hydrogen gas from the alane during the process.

Figure 2:
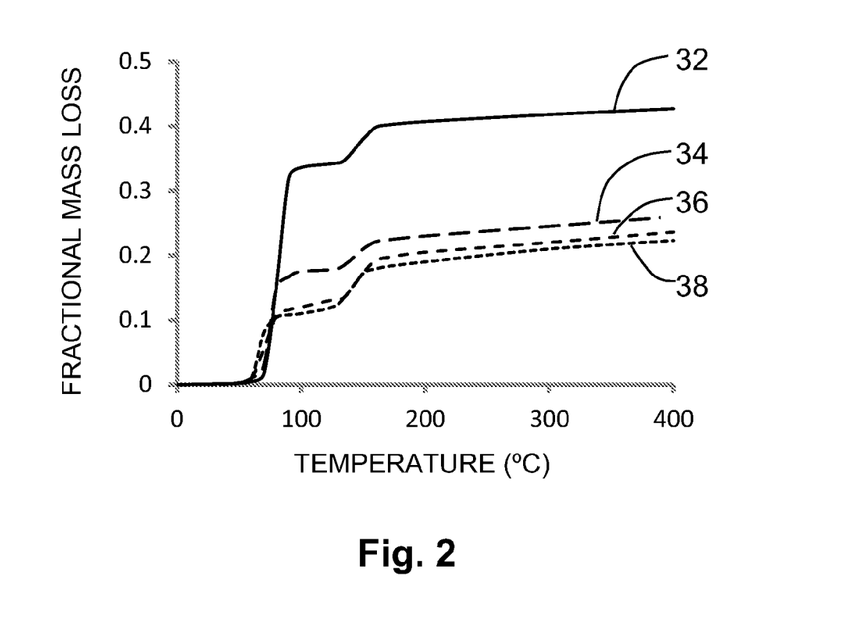
FIG. 2 shows TGA results for the electrospraying of 1 weight percent alane-etherate solutions compared to a conventional vacuum drying method.

The electrosprayed alane can be annealed by controlling the ambient temperature of the spraying chamber, or by heating the collecting plate to the desired temperature. The TGA results for electrospraying of a 1 weight percent solution of alane in diethyl ether are shown in FIG. 2 and compared to the same solution dried using conventional methods. In FIG. 2, the annealing temperature in degrees Celsius is shown on the x-axis and the fractional mass loss on the y-axis. Line 32 shows conventionally dried solution, and lines 34, 36 and 38 show electrosprayed solution, with the spraying done vertically (as in FIG. 1) in line 34 and horizontally in each of lines 36 and 38. This data shows a significantly greater reduction in residual ether using the electrospray process (to about 83 weight percent) compared to conventional drying methods. The majority of the ether was removed at annealing temperatures from about 60° C. to 100° C. Hydrogen gas was evolved beginning at about 120° C.

NMR testing was done on material collected on the collection plate. The $^{27}$Al-NMR results showed only the presence of residual $LiAlH_4$ and alane-etherate. TGA testing was performed on electrosprayed alane-etherate that was annealed at 65° C. The results showed pure hydrogen was released. The onset of dehydrogenation was lower compared to macrocrystalline alane (ca. 120° C. vs. 180° C.), presumably because of the small, uniform particle size of the electrosprayed alane. X-ray diffraction confirmed the formation of α-alane upon annealing at 65° C.

Figure 3:
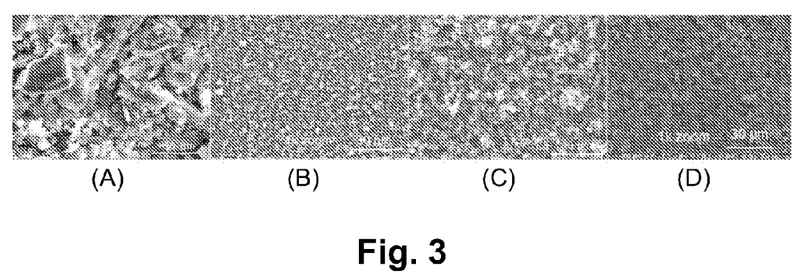
FIG. 3 shows SEM images comparing the alane produced by electrospraying to conventionally-dried alane-etherate.

The SEM images in FIG. 3 show the difference in particle size and morphology between conventionally dried alane and electrosprayed alane-etherate. Image (A) shows alane-etherate that was vacuum dried and ground with a mortar and pestle, image (B) shows 0.5 weight percent alane in diethyl ether after electrospraying, image (C) shows 1.0 weight percent alane in diethyl ether after electrospraying, and image (D) shows 1.0 weight percent alane in diethyl ether after electrospraying and annealing at 65° C. Electrosprayed 1 weight percent alane solutions had a range of particle sizes from 1 μm to 500 nm, while electrosprayed 0.5 weight percent alane solutions had a particle size in the range of 300 nm to 100 nm. Thus, the solution concentration affected particle size, with the more dilute alane solution producing smaller particles. The uniformity of the particle size (fine particle size with consistent morphology) was maintained after annealing the electrosprayed alane particles at 65° C. In comparison, the vacuum dried sample, even after grinding, showed a very inconsistent morphology.

This example demonstrates that electrospraying improves the process of alane production, by making it easier to remove the solvent, eliminating the need for a vacuum drying stage, and consistently producing the correct phase with a beneficial morphology.

The above description is considered that of the preferred embodiments only. Modifications of the invention will occur to those skilled in the art and to those who make or use the invention. Therefore, it is understood that the embodiments described above is merely for illustrative purposes and not intended to limit the scope of the invention, which is defined by the following claims as interpreted according to the principles of patent law, including the Doctrine of Equivalents.

The invention claimed is:

1. A method of producing solid α-alane comprising:
reacting one or more alkyl halides with one or more metal alanates in a solvent comprising an ether to form an alane-ether mixture;
removing the solvent from the alane-ether mixture by spray desolvation;
annealing the spray desolvated alane; and,
collecting the solid α-alane;
wherein the solid α-alane exhibits a range of particle sizes of either a range of from 1 μm to 500 nm or a range of from 300 nm to 100 nm.

2. The method of claim 1, wherein a single alkyl halide is used.

3. The method of claim 1, wherein a single metal alanate is used.

4. The method of claim 1, wherein the alkyl halide comprises one of benzyl chloride and n-butyl bromide.

5. The method of claim 1, wherein the alkyl metal halide comprises n-butyl bromide.

6. The method of claim 1, wherein the metal alanate comprises sodium aluminum hydride.

7. The method of claim 1, wherein the solvent comprises diethyl ether.

8. The method of claim 1, wherein the method includes adding a tertiary amine in the step of forming the alane-etherate mixture.

9. The method of claim 8, wherein the tertiary amine is removed.

10. The method of claim 8, wherein the tertiary amine comprises a trialklylamine.

11. The method of claim 1, wherein the metal alanate comprises lithium aluminum hydride.

12. A method of producing α-alane comprising:
reacting one or more alkyl halides with sodium aluminum hydride in a solvent comprising toluene, ether, a trialkylamine, and a metal halide to form an alane solution;
removing the trialkylamine by sparging the alane solution with an inert gas;
removing the metal halide from the alane solution;
removing ether from the alane solution by distillation; and,
collecting the solid α-alane.

13. The method of claim 12, wherein removing ether from the alane solution comprises vacuum distillation.

14. The method of claim 1, wherein the spray desolvation comprises electrospinning the alane-ether mixture.

15. The method of claim 1, wherein the spray desolvation comprises electrospraying the alane-ether mixture.

16. The method of claim 15, wherein the annealing comprises heating at a temperature from greater than 60° C. to less than 120° C.

17. The method of claim 16, wherein the temperature is at least 65° C.

18. The method of claim 16, wherein the temperature is no greater than 100° C.

19. The method of claim 16, wherein the annealing is done at a temperature of from 65° C. to 100° C.

20. The method of claim 6, wherein the solvent further comprises a soluble $Li^+$ species.

21. The method of claim 12, wherein the solvent comprises toluene and diethyl ether, and the ether is removed by distilling the ether from the alane solution until the alane solution contains 8% to 10% ether.

* * * * *